(12) United States Patent
Matsuura (10) Patent No.: US 11,549,873 B2
(45) Date of Patent: Jan. 10, 2023

(54) TENSILE TESTING MACHINE AND CONTROL METHOD OF TENSILE TESTING MACHINE

(71) Applicant: SHIMADZU CORPORATION, Kyoto (JP)

(72) Inventor: Tohru Matsuura, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 416 days.

(21) Appl. No.: 16/800,150

(22) Filed: Feb. 25, 2020

(65) Prior Publication Data

US 2020/0271558 A1 Aug. 27, 2020

(30) Foreign Application Priority Data

Feb. 26, 2019 (JP) .............................. JP2019-032302

(51) Int. Cl.
| | |
|---|---|
| *G01L 1/00* | (2006.01) |
| *G01N 3/10* | (2006.01) |
| *G01L 1/10* | (2006.01) |
| *G01B 7/16* | (2006.01) |

(52) U.S. Cl.
CPC ............ *G01N 3/10* (2013.01); *G01B 7/16* (2013.01); *G01L 1/103* (2013.01); *G01N 2203/0012* (2013.01); *G01N 2203/0017* (2013.01); *G01N 2203/0218* (2013.01); *G01N 2203/0688* (2013.01)

(58) Field of Classification Search
CPC ............ G01N 3/10; G01N 2203/0012; G01N 2203/0017; G01N 2203/0218; G01N 2203/0688; G01B 7/16; G01L 1/103
See application file for complete search history.

(56) References Cited

U.S. PATENT DOCUMENTS

| | | | |
|---|---|---|---|
| 2006/0117866 A1* | 6/2006 | Myers ...................... | G01N 3/32 73/837 |
| 2012/0240688 A1* | 9/2012 | Myers ...................... | G01N 3/32 73/826 |

(Continued)

FOREIGN PATENT DOCUMENTS

JP 2006-010409 A 1/2006

OTHER PUBLICATIONS

Office Action dated May 10, 2022 issued by the Japanese Patent Office in Japanese Application No. 2019-032302.

*Primary Examiner* — Max H Noori
(74) *Attorney, Agent, or Firm* — Sughrue Mion, PLLC (57) ABSTRACT

A high-speed tensile testing machine conducts a tensile test on a test piece by applying a test force to the test piece. The high-speed tensile testing machine includes a detection unit configured to detect a test period indicating a time from when the test piece starts to deform under action of the test force to when the test piece breaks, and a determination unit configured to determine validity of a test result of the tensile test, on the basis of the test period and natural vibration of the high-speed tensile testing machine. Specifically, in the case where the test period is a predetermined multiple or more of a specific cycle indicating a cycle of the natural vibration of the high-speed tensile testing machine, the determination unit determines that the test result of the tensile test is valid.

10 Claims, 6 Drawing Sheets

(56) References Cited

U.S. PATENT DOCUMENTS

| | | | | |
|---|---|---|---|---|
| 2013/0047741 | A1* | 2/2013 | Woo | G01N 3/20 |
| | | | | 73/760 |
| 2018/0364139 | A1* | 12/2018 | Miyazaki | G01N 29/045 |
| 2018/0364140 | A1* | 12/2018 | Miyazaki | G01N 3/307 |
| 2019/0086279 | A1* | 3/2019 | Matsuura | G01L 1/26 |
| 2019/0234793 | A1* | 8/2019 | Matsuura | G01N 3/08 |
| 2019/0234849 | A1* | 8/2019 | Matsuura | G01N 3/08 |
| 2022/0106672 | A1* | 4/2022 | Cambier | C22C 21/10 |
| 2022/0112131 | A1* | 4/2022 | Hou | C04B 14/185 |
| 2022/0176071 | A1* | 6/2022 | Pedroso | A61M 25/0068 |

* cited by examiner

TENSILE TESTING MACHINE AND CONTROL METHOD OF TENSILE TESTING MACHINE

INCORPORATION BY REFERENCE

The present application claims priority under 35 U.S.C. § 119 to Japanese Patent Application No. 2019-032302 filed on Feb. 26, 2019. The content of the applications is incorporated herein by reference in its entirety.

BACKGROUND

Technical Field

The present invention relates to a tensile testing machine and a control method of the tensile testing machine.

Related Art

A tensile testing machine applies a tensile test force by gripping both ends of a test piece by a movement-side grip and a fixing-side grip, and by moving the movement-side grip (see JP 2006-10409 A).

SUMMARY

However, with the tensile testing machine, in a case where a time from start to end of a tensile test is extremely short, vibration of the tensile testing machine possibly affects validity of a test result.

Specifically, with the tensile testing machine, in a case where a tensile speed is extremely high, and a time from when a test piece starts to deform under action of a load until when the test piece breaks is extremely short, natural vibration of the tensile testing machine possibly affects validity of the test result.

An object of the present invention is to provide a tensile testing machine capable of determining validity of a test result, and a control method of the tensile testing machine.

A first aspect is a tensile testing machine for conducting a tensile test on a test piece by applying a load to the test piece, the tensile testing machine including: a detection unit configured to detect a test period indicating a time from start to end of the tensile test; and a determination unit configured to determine validity of a test result of the tensile test, on a basis of the test period and natural vibration of the tensile testing machine.

According to a second aspect, in the first aspect, in a case where a frequency spectrum indicating the natural vibration of the tensile testing machine includes a plurality of peaks, a frequency of a peak, an intensity of which is equal to or greater than a predetermined intensity, among the plurality of peaks is used as a frequency of the natural vibration of the tensile testing machine.

According to a third aspect, in the second aspect, in a case where the frequency spectrum includes a plurality of peaks, intensities of which are equal to or greater than the predetermined intensity, a frequency of a peak with a smallest frequency among the plurality of peaks, the intensities of which are equal to or greater than the predetermined intensity, is used as the frequency of the natural vibration of the tensile testing machine.

According to a fourth aspect, in one of the first to third aspects, the determination unit determines the validity of the test result of the tensile test, on a basis of the test period and a specific cycle indicating a cycle corresponding to a frequency of the natural vibration of the tensile testing machine.

According to a fifth aspect, in the fourth aspect, in a case where the test period is a predetermined multiple or more of the specific cycle, the determination unit determines that the test result of the tensile test is valid.

A sixth aspect is a control method of a tensile testing machine for conducting a tensile test on a test piece by applying a load to the test piece, the control method including: detecting a test period indicating a time from start to end of the tensile test; and determining validity of a test result of the tensile test, on a basis of the test period and natural vibration of the tensile testing machine.

According to the first aspect, the validity of the test result of the tensile test is determined on the basis of the test period and the natural vibration of the tensile testing machine.

Accordingly, the validity of the test result of the tensile test may be determined.

According to the second aspect, a peak frequency, the intensity of which is equal to or greater than the predetermined intensity, among a plurality of peak frequencies is used as the frequency of the natural vibration of the tensile testing machine.

Accordingly, the validity of the test result of the tensile test may be accurately determined.

According to the third aspect, in a case where the frequency spectrum includes a plurality of peaks, intensities of which are equal to or greater than the predetermined intensity, a peak frequency with the smallest frequency among the plurality of peak frequencies, intensities of which are equal to or greater than the predetermined intensity, is used as the frequency of the natural vibration of the tensile testing machine.

Accordingly, the validity of the test result of the tensile test may be more accurately determined.

According to the fourth aspect, the validity of the test result of the tensile test is determined on the basis of the test period and the specific cycle indicating the cycle corresponding to the frequency of the natural vibration of the tensile testing machine.

Accordingly, the validity of the test result of the tensile test may be determined with a simple configuration.

According to the fifth aspect, the test result of the tensile test is determined to be valid, in a case where the test period is the predetermined multiple or more of the specific cycle.

Accordingly, whether the test result of the tensile test is valid or not may be accurately determined by appropriately setting the value of the predetermined multiple.

According to the sixth aspect, an advantageous effect similar to that of the first aspect may be achieved.

DETAILED DESCRIPTION

Hereinafter, an embodiment of the present invention will be described with reference to the drawings.

Figure 1:
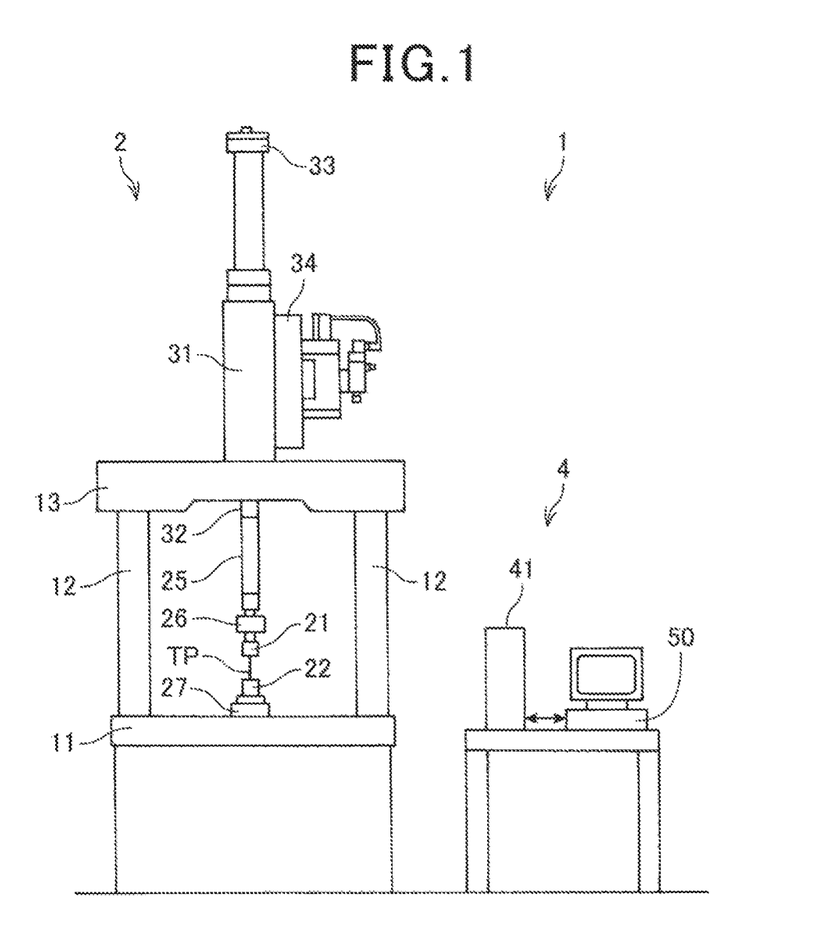
FIG. 1 is a diagram schematically showing a configuration of a high-speed tensile testing machine according to an embodiment of the present invention.

FIG. 1 is a diagram schematically showing a configuration of a high-speed tensile testing machine 1 according to the present embodiment.

The high-speed tensile testing machine 1 of the present embodiment applies a tensile force to a test piece TP, and measures mechanical properties such as tensile strength of a sample, a yield point, elongation, reduction of area, and the like. Such a high-speed tensile testing machine 1 includes a tensile testing machine main body 2 for conducting a tensile test by applying a test force F to a test piece TP, which is a test target material, and a control unit 4 for controlling tensile testing operation of the testing machine main body 2.

Additionally, the high-speed tensile testing machine 1 corresponds to an example of a "tensile testing machine".

The testing machine main body 2 includes a table 11, a pair of supports 12 provided upright on the table 11, a cross yoke 13 installed across the pair of supports 12, and a hydraulic cylinder 31 fixed to the cross yoke 13.

The table 11 supports the pair of supports 12. The pair of supports 12 supports the cross yoke 13. The cross yoke 13 supports the hydraulic cylinder 31.

The hydraulic cylinder 31 includes the hydraulic cylinder 31, a piston rod 32, a stroke sensor 33, and a servo valve 34.

The hydraulic cylinder 31 operates by hydraulic oil that is supplied through the servo valve 34 from a hydraulic pressure source, not shown, disposed inside the table.

The piston rod 32 is capable of freely protruding and retracting into the hydraulic cylinder 31.

The stroke sensor 33 detects an amount of movement of the piston rod 32. A detection signal of the stroke sensor 33 is transmitted to a main body control device 41.

An upper grip 21 is connected, through an approach jig 25 and a joint 26, to the piston rod 32. Furthermore, a lower grip 22 is connected, through a load cell 27 which is a test force detector, to the table 11.

An approach section is provided by the approach jig 25 in a tensile direction, and the testing machine main body 2 pulls up the piston rod 32 at a high speed of 0.1-20 m/sec, for example. The testing machine main body 2 thus conducts a high-speed tensile test of rapidly separating a pair of grips (that is, the upper grip 21 and the lower grip 22) gripping both end portions of a test piece TP.

Displacement (stroke) of a load mechanism, or in other words, the amount of movement of the piston rod 32, at the time of a tensile impact test is detected by the stroke sensor 33, and a test force F at the time is detected by the load cell 27.

The control unit 4 includes a main body control device 41 for controlling operation of the testing machine main body 2, and a personal computer 50. The main body control device 41 includes a memory for storing programs, an arithmetic device for performing various arithmetic operations, such as a central processing unit (CPU), and a communication unit for communicating with the personal computer 50.

The memory, the arithmetic device, and the communication unit are interconnected by a bus. Furthermore, the main body control device 41 includes a test control unit as a functional element. The test control unit is stored in the memory as a test control program. When conducting a tensile impact test, the test control program is executed to supply a control signal to the servo valve 34, and to cause the hydraulic cylinder 31 to operate. Output signals of the stroke sensor 33 and output signals of the load cell 27 are captured by the main body control device 41 at predetermined time intervals.

The personal computer 50 includes a memory including a read only memory (ROM) storing control programs and the like, a random access memory (RAM) where a program is loaded at the time of execution of the program and where data is temporarily stored, and the like, an arithmetic device for performing various arithmetic operations, such as a central processing unit (CPU), a communication unit for communicating with an externally connected appliance such as the main body control device 41, a storage device for storing data, a display device, and an input device.

Additionally, the storage device is a storage unit for storing time-series data of the test force F of a high-speed tensile test, and the like, and is configured by a mass storage such as a hard disk drive (HDD). The memory, the arithmetic device, the communication unit, the storage device, the display device, and the input device are interconnected by a bus.

Figure 2:
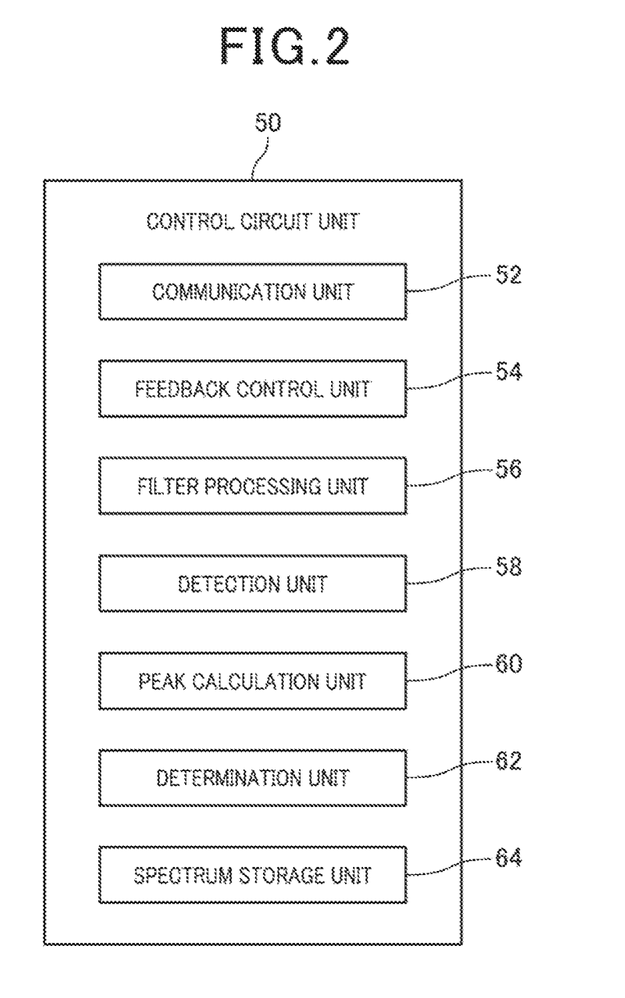
FIG. 2 is a block diagram showing a functional configuration of a control circuit unit.

FIG. 2 is a block diagram showing a functional configuration of the personal computer 50.

The personal computer 50 includes a communication unit 52, a feedback control unit 54, a filter processing unit 56, a detection unit 58, a peak calculation unit 60, a determination unit 62, and a spectrum storage unit 64.

Additionally, the personal computer 50 is not limited to a computer, and may be one or a plurality of appropriate circuits, such as integrated circuits such as IC chips or LSIs.

The communication unit 52 communicates with the main body control device 41, and receives, from the main body control device 41, settings for test conditions, setting values for various setting parameters, an execution command or an interrupt command fora tensile test, and the like. Furthermore, the communication unit 52 transmits a test force measurement value Fd based on a test force measurement signal, to the main body control device 41 at an appropriate timing.

The feedback control unit 54 feedback-controls the servo valve 34 of the testing machine main body 2, and conducts a tensile test.

The feedback control unit 54 is a circuit for performing feedback control of the servo valve 34. That is, the feedback control unit 54 calculates a command value regarding an amount of displacement x for causing a test force measurement value Fd to coincide with a test force target value, which is a target value of a test force, on the basis of a deviation between the test force measurement value Fd and the test force target value, and outputs a command signal indicating the command value to the servo valve 34.

In the present embodiment, proportional-integral-differential (PID) control is used for the feedback control, and the feedback control unit 54 includes a so-called PID controller. An appropriate control law determined on the basis of elasticity (a relationship between the amount of displacement x and the test force F) of a material is used for calculation of the command value.

The spectrum storage unit 64 stores a frequency spectrum SP indicating natural vibration of the high-speed tensile testing machine 1.

For example, the frequency spectrum SP is created in the following manner. That is, first, a user creates a state in which neither the upper grip 21 nor the lower grip 22 is gripping a test piece TP. Then, the user hits a lower end portion of the upper grip 21 by an impact hammer, and thereby applies an impact force to the high-speed tensile testing machine 1. Then, time-series signals detected by the load cell 27 on the basis of the impact force are stored in the storage device. Fast Fourier transform (FFT) processing is performed on the time-series signals stored in the storage device, and the frequency spectrum SP is thereby obtained.

Additionally, the frequency spectrum SP may alternatively be obtained by conducting a high-speed tensile test, and by performing the FFT processing on time-series signals detected by the load cell 27 after the test piece TP is broken.

Furthermore, in this case, processing by the filter processing unit 56 is stopped at the time of storing the time-series signals in the storage device. This is to avoid removal of a component corresponding to the natural vibration of the high-speed tensile testing machine 1 by the filter processing unit 56.

The frequency spectrum SP will be described later in further detail with reference to FIG. 3.

The filter processing unit 56 removes, from the test force measurement value Fd, a component corresponding to the natural vibration of the high-speed tensile testing machine 1. The test force measurement value Fd corresponds to an example of a "detection signal of a tensile test".

For example, the filter processing unit 56 reduces a component corresponding to a natural frequency FB of the high-speed tensile testing machine 1 from the test force measurement value Fd.

Specifically, the detection signal of the test force measurement value Fd is caused to pass through a high-pass filter and a low-pass filter, and the component corresponding to the natural frequency FB of the high-speed tensile testing machine 1 included in the detection signal of the test force measurement value Fd is thereby removed. The high-pass filter allows a frequency that is higher than the natural frequency FB by a frequency ΔFA, or in other words, a frequency that is equal to or higher than a frequency (FB+ΔFB), to pass through. The low-pass filter allows a frequency that is lower than the natural frequency FB by a frequency ΔFB, or in other words, a frequency that is equal to or lower than a frequency (FA−ΔFB), to pass through. For example, the natural frequency FB is 17.55 kHz, and the frequency ΔFA and the frequency ΔFB are each 1 kHz.

The detection unit 58 detects a test period PD indicating a time from start to end of a tensile test.

Specifically, the detection unit 58 detects a test period PD indicating a time from when the test piece TP starts to deform under action of the test force F until when the test piece TP breaks.

For example, in the case where the amount of displacement x is increased at a constant speed, the test piece TP deforms in the following manner. The test piece TP does not deform until the amount of displacement x reaches a first predetermined value x1. When the amount of displacement x is at or greater than the first predetermined value x1 and smaller than a second predetermined value x2, the test piece TP is elastically deformed. Then, when the amount of displacement x is at or greater than the second predetermined value x2 and smaller than a third predetermined value x3, the test piece TP is plastically deformed. When the amount of displacement x reaches the third predetermined value x3, the test piece TP breaks.

In the case where the test piece TP deforms in the above manner, the test period PD indicates a time point from when the amount of displacement x reaches the first predetermined value x1 to a time point when the amount of displacement x reaches the third predetermined value x3.

The test period PD will be described later with reference to FIGS. 5 and 6.

The peak calculation unit 60 determines a specific peak frequency FA indicating a specific peak PA included in the frequency spectrum SP. The peak P corresponds to a maximal value of an intensity B in the frequency spectrum SP. Additionally, the specific peak frequency FA corresponds to an example of a "frequency of natural vibration of the tensile testing machine 1".

Specifically, in the case where a plurality of peaks PN are included in the frequency spectrum SP, the peak calculation unit 60 determines, as the specific peak frequency FA, a frequency of a peak, the intensity B of which is equal to or greater than a predetermined intensity BA, among the plurality of peaks PN.

More specifically, in the case where a plurality of peaks PM, intensities of which are equal to or greater than the predetermined intensity BA, are included in the frequency spectrum SP, the peak calculation unit 60 determines, as the specific peak frequency FA, a frequency of a peak at which a frequency FR is the smallest among the plurality of peaks PM, the intensities of which are equal to or greater than the predetermined intensity BA.

The peak calculation unit 60 will be described later in detail with reference to FIG. 3.

The determination unit 62 determines validity of a test result of the tensile test, on the basis of the test period PD and the natural vibration of the high-speed tensile testing machine 1.

Specifically, the determination unit 62 determines whether or not the test result of the tensile test is valid, on the basis of the test period PD and a specific cycle TA indicating a cycle corresponding to the specific peak frequency FA.

More specifically, in the case where the test period PD is a predetermined multiple NA or more of the specific cycle TA, the determination unit 62 determines that the test result of the tensile test is valid, and in the case where the test period PD is less than the predetermined multiple NA of the specific cycle TA, the determination unit 62 determines that the test result of the tensile test is not valid. The predetermined multiple NA is eight times, for example.

Figure 3:
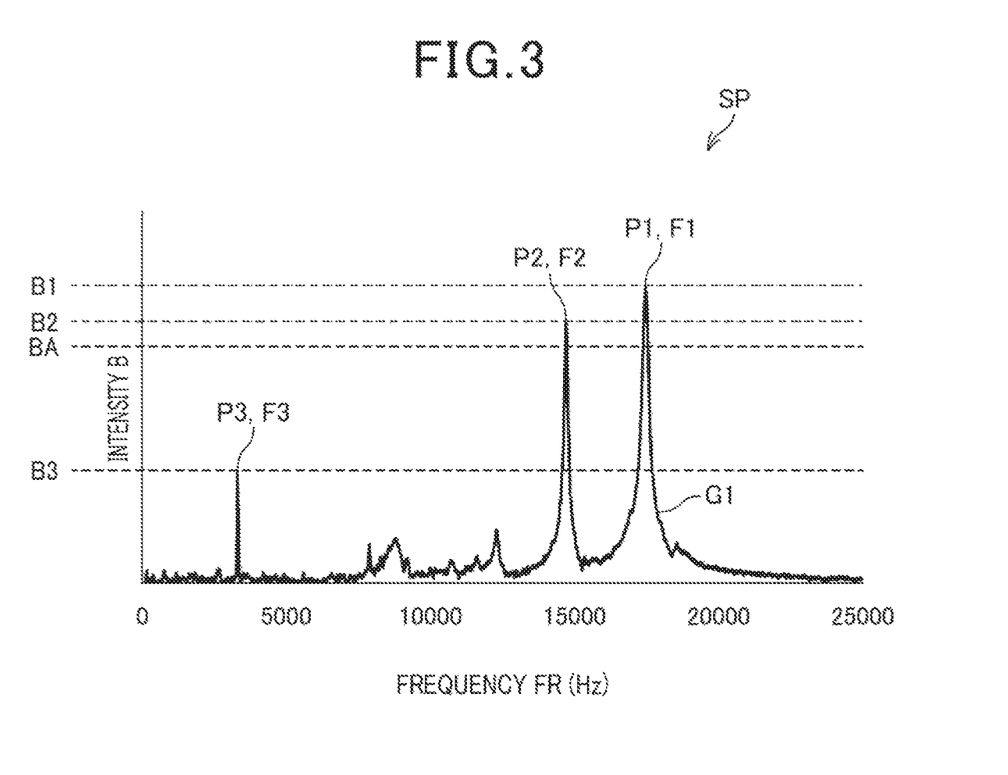
FIG. 3 is a diagram showing a frequency spectrum indicating natural vibration of the high-speed tensile testing machine.

FIG. 3 is a diagram showing an example of the frequency spectrum SP indicating the natural vibration of the high-speed tensile testing machine 1.

A horizontal axis in FIG. 3 indicates the frequency FR, and a vertical axis in FIG. 3 indicates the intensity B. A graph G1 shown in FIG. 3 shows a relationship between the frequency FR and the intensity B in the frequency spectrum SP.

As shown in FIG. 3, the frequency spectrum SP includes a first peak P1, a second peak P2, and a third peak P3.

A frequency F1 of the first peak P1 is 17.55 kHz, and an intensity B1 of the first peak P1 is greater than an intensity B2 of the second peak P2 and an intensity B3 of the third peak P3. In other words, the first peak P1 indicates a maximum peak PX.

A frequency F2 of the second peak P2 is 14.70 kHz, and the intensity B2 of the second peak P2 is greater than the intensity B3 of the third peak P3, and smaller than the intensity B1 of the first peak P1.

A frequency F3 of the third peak P3 is 3.50 kHz, and the intensity B3 of the third peak P3 is smaller than the intensity B1 of the first peak P1 and the intensity B2 of the second peak P2.

The intensity B2 of the second peak P2 is equal to or greater than the predetermined intensity BA. For example, the predetermined intensity BA is 80% of the intensity B1 of the first peak P1. In this manner, the frequency spectrum SP includes a plurality of peaks PM, the intensities of which are equal to or greater than the predetermined intensity BA. The plurality of peaks PM correspond to the first peak P1 and the second peak P2.

The peak calculation unit 60 determines, as the specific peak frequency FA, a frequency of a peak with the smallest frequency FR among the plurality of peaks PM, the intensities of which are equal to or greater than the predetermined intensity BA. Specifically, the peak calculation unit 60 determines the frequency F2 of the second peak P2 as the specific peak frequency FA. That is, the specific peak frequency FA is the frequency F2 (=14.70 kHz) of the second peak P2.

The specific cycle TA indicating the cycle corresponding to the specific peak frequency FA is 0.068 msec (=1/F2).

In the case where the test period PD is the predetermined multiple NA or more of the specific cycle TA, the determination unit 62 determines that the test result of the tensile test is valid, and in the case where the test period PD is smaller than the predetermined multiple NA of the specific cycle TA, the determination unit 62 determines that the test result of the tensile test is not valid. The predetermined multiple NA is eight times, for example.

Figure 4:
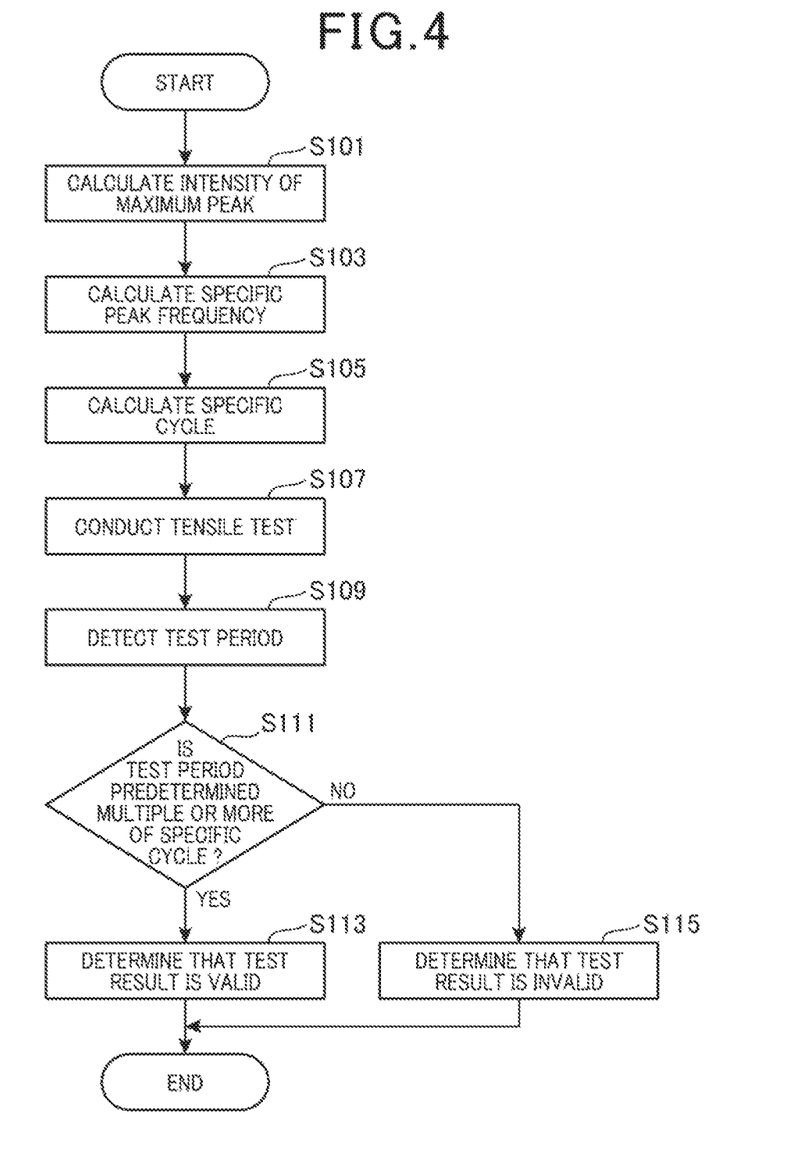
FIG. 4 is a flowchart showing a process by the control circuit unit.

FIG. 4 is a flowchart showing an example of a process by the personal computer 50.

First, in step S101, the peak calculation unit 60 calculates the intensity B of the maximum peak PX.

Next, in step S103, the peak calculation unit 60 calculates the specific peak frequency FA. Specifically, the peak calculation unit 60 determines, as the specific peak frequency FA, a frequency of a peak with the smallest frequency FR among the plurality of peaks PM, the intensities of which are equal to or greater than the predetermined intensity BA. The predetermined intensity BA is 80% of the intensity B of the maximum peak PX, for example.

Next, in step S105, the personal computer 50 calculates the specific cycle TA from the specific peak frequency FA. The specific cycle TA is 0.068 msec, for example.

Then, in step S107, the personal computer 50 conducts the tensile test on a test piece TP.

Next, in step S109, the detection unit 58 detects the test period PD indicating a time from when the test piece TP starts to deform under action of the test force F until when the test piece TP breaks.

Next, in step S11, the determination unit 62 determines whether or not the test period PD is the predetermined multiple NA or more of the specific cycle TA.

In the case where the test period PD is determined by the determination unit 62 to be the predetermined multiple NA or more of the specific cycle TA (step S111: YES), the process proceeds to step S113.

Then, in step S113, the determination unit 62 determines that the test result of the tensile test is valid, and the process is ended.

In the case where the test period PD is determined by the determination unit 62 to be not the predetermined multiple NA or more of the specific cycle TA (step S111: NO), the process proceeds to step S115.

Then, in step S115, the determination unit 62 determines that the test result of the tensile test is not valid (=the test result is invalid), and the process is ended.

Additionally, step S109 corresponds to an example of a "detecting step". Steps S111 to S115 correspond to an example of a "determining step".

Figure 5:
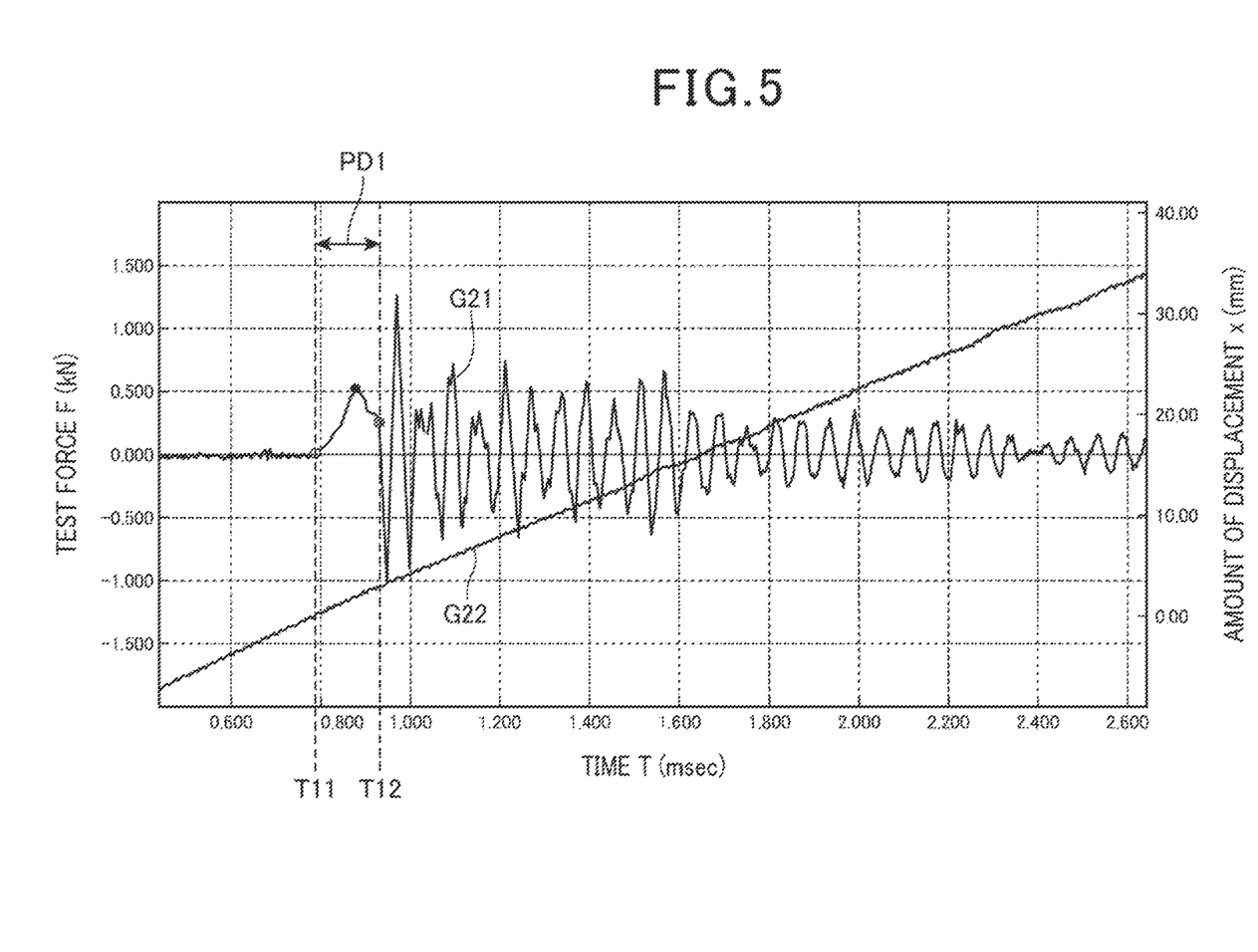
FIG. 5 is a graph showing an example of a tensile test result.

FIG. 5 is a graph showing an example of a tensile test result obtained by the high-speed tensile testing machine 1.

A horizontal axis in FIG. 5 indicates time T (msec). Vertical axes in FIG. 5 indicate the test force F (kN) and the amount of displacement x. A graph G21 in FIG. 5 shows a relationship between the time T and the test force F. A graph G22 in FIG. 5 indicates a relationship between the time T and the amount of displacement x.

Rubber is used as the test piece TP.

As shown by the graph G22, the amount of displacement x increases at an approximately constant speed.

As shown by the graph G21, at a time point T11, the test piece TP starts to elastically deform under action of the test force F. Furthermore, at a time point T12, the test piece TP breaks.

A test period PD1 indicates a time from the time point T11 to the time point T12. The test period PD1 is 0.16 msec.

In this case, the test period PD1 is less than the predetermined multiple NA of the specific cycle TA. Additionally, the specific cycle TA is 0.068 msec, and the predetermined multiple NA is eight times. That is, the predetermined multiple NA of the specific cycle TA is 0.544 msec.

Accordingly, the tensile test result shown in FIG. 5 is determined by the determination unit 62 to be not valid (= to be invalid).

Figure 6:
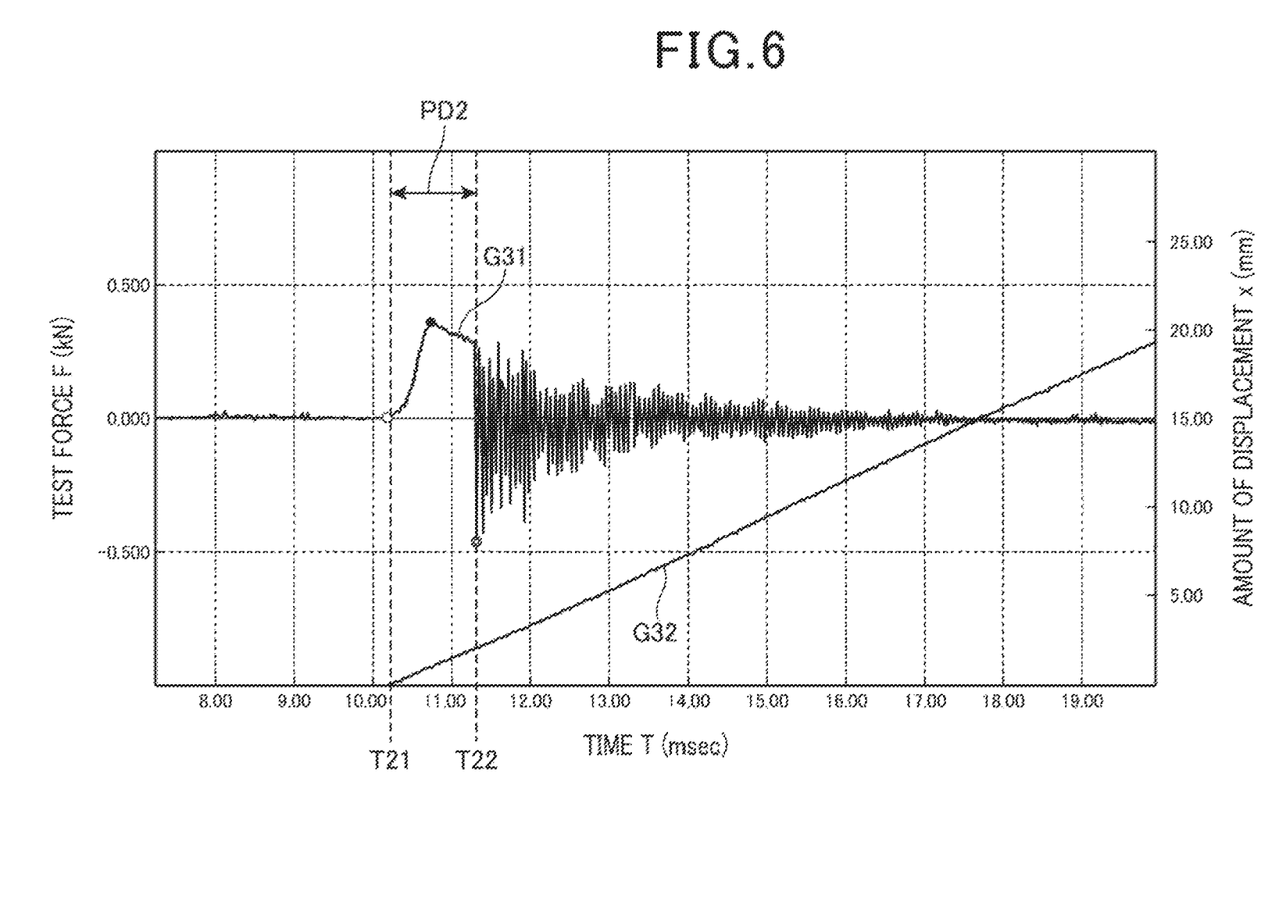
FIG. 6 is a graph showing another example of the tensile test result.

FIG. 6 is a graph showing another example of the tensile test result obtained by the high-speed tensile testing machine 1.

A horizontal axis in FIG. 6 indicates time T (msec). Vertical axes in FIG. 6 indicate the test force F (kN) and the amount of displacement x. A graph G31 in FIG. 6 shows a relationship between the time T and the test force F. A graph G32 in FIG. 6 shows a relationship between the time T and the amount of displacement x.

Rubber is used as the test piece TP.

As shown by the graph G32, the amount of displacement x increases at an approximately constant speed.

As shown by the graph G31, at a time point T21, the test piece TP starts to elastically deform under action of the test force F. Furthermore, at a time point T22, the test piece TP breaks.

A test period PD2 indicates a time from the time point T21 to the time point T22. The test period PD2 is 1.13 msec.

In this case, the test period PD2 is the predetermined multiple NA or more of the specific cycle TA. Additionally, the specific cycle TA is 0.068 msec, and the predetermined multiple NA is eight times. That is, the predetermined multiple NA of the specific cycle TA is 0.544 msec.

Accordingly, the tensile test result shown in FIG. 6 is determined by the determination unit 62 to be valid.

Following advantageous effects are achieved by the present embodiment.

With the high-speed tensile testing machine 1 of the present embodiment, the detection unit 58 detects the test period PD indicating the time from when the test piece TP starts to deform under action of the test force F until when the test piece TP breaks. The determination unit 62 determines whether the test result of the tensile test is valid or not, on the basis of the test period PD and the natural vibration of the tensile testing machine.

Generally, in the case where a cycle of the natural vibration of the tensile testing machine approximates to the test period PD, a tensile test cannot be accurately performed. That "a cycle of the natural vibration of the tensile testing machine approximates to the test period PD" is a case where the cycle of the natural vibration of the tensile testing machine is 1/10 or more of the test period PD, for example.

Accordingly, the determination unit 62 may determine validity of the test result of a tensile test.

Furthermore, with the high-speed tensile testing machine 1 of the present embodiment, in the case where the frequency spectrum SP indicating the natural vibration of the high-speed tensile testing machine 1 includes a plurality of peaks, the peak calculation unit 60 determines the frequency of the peak PN, the intensity B of which is equal to or greater than the predetermined intensity BA, among the plurality of peaks PN to be the frequency of the natural vibration of the high-speed tensile testing machine 1.

Accordingly, for example, the determination unit 62 may accurately determine validity of the test result of the tensile test by comparing the cycle of the natural vibration and the test period PD.

Moreover, with the high-speed tensile testing machine 1 of the present embodiment, the peak calculation unit 60 determines the frequency of the peak P with the lowest frequency among the plurality of peaks PM, the intensities of which are equal to or greater than the predetermined intensity BA, as the frequency of the natural vibration of the high-speed tensile testing machine 1.

The smaller the frequency of the natural vibration of the high-speed tensile testing machine 1, the shorter the specific cycle TA. Furthermore, the shorter the specific cycle TA, the more stringent the determination by the determination unit 62. That is, it is more likely that validity of the test result of the tensile test is denied.

Accordingly, for example, the determination unit 62 may more accurately determine validity of the test result of the tensile test by comparing the specific cycle TA and the test period PD.

Moreover, with the high-speed tensile testing machine 1 of the present embodiment, the determination unit 62 determines validity of the test result of the tensile test on the basis of the test period PD and the specific cycle TA indicating the cycle of the natural vibration of the high-speed tensile testing machine 1.

Accordingly, the determination unit 62 may determine validity of the test result of the tensile test with a simple configuration.

Moreover, with the high-speed tensile testing machine 1 of the present embodiment, the determination unit 62 determines that the test result of the tensile test is valid, in the case where the test period PD is the predetermined multiple NA or more of the specific cycle TA.

Accordingly, by setting an appropriate value as the predetermined multiple NA, whether the test result of the tensile test is valid or not may be accurately determined by the determination unit 62 with a simple configuration.

Additionally, the embodiment described above is merely an illustration of a mode of the present invention, and modifications and applications may be freely made within the scope of the present invention.

In the embodiment described above, the predetermined multiple NA is eight times, for example, but the present invention is not limited to such a case. For example, it is sufficient if the predetermined multiple NA is at least one time. Furthermore, a user may be allowed to set a value of the predetermined multiple NA.

Moreover, the determination unit 62 may determine that the test result of the tensile test is valid, in a case where a difference obtained by subtracting the specific cycle TA from the test period PD is a predetermined time or longer.

In the embodiment described above, the peak calculation unit 60 determines, as the specific peak frequency FA, the frequency of the peak P with the smallest frequency among the plurality of peaks PM, the intensities of which are equal to or greater than the predetermined intensity BA, but the present invention is not limited to such a case. It is sufficient if the peak calculation unit 60 determines, as the specific peak frequency FA, the frequency of one peak P among the plurality of peaks PM, the intensities of which are equal to or greater than the predetermined intensity BA. For example, the peak calculation unit 60 may determine the frequency of the maximum peak PX as the specific peak frequency FA. Additionally, the specific peak frequency FA indicates the frequency of the natural vibration of the high-speed tensile testing machine 1.

In the embodiment described above, the peak calculation unit 60 determines, as the specific peak frequency FA, the frequency of the peak PN, the intensity B of which is equal to or greater than the predetermined intensity BA, among the plurality of peaks PN, but the present invention is not limited to such a case. It is sufficient if the peak calculation unit 60 determines, as the specific peak frequency FA, the frequency of one peak P among the plurality of peaks PN. For example, the peak calculation unit 60 may determine the frequency of the maximum peak PX as the specific peak frequency FA.

In the embodiment described above, the peak calculation unit 60 determines the specific peak frequency FA, but the present invention is not limited to such a case. The specific peak frequency FA may be calculated in advance by the peak calculation unit 60, and the specific peak frequency FA may be stored in a memory device or a storage device of the personal computer 50. Furthermore, the specific cycle TA may be calculated in advance, and the specific cycle TA may be stored in the memory device or the storage device of the personal computer 50. In these cases, the process by the personal computer 50 is simplified.

In the embodiment described above, a drive source of the load mechanism of the high-speed tensile testing machine 1 is not limited to the servo valve 34, and may be other power sources such as an electromagnetic actuator, for example.

In the embodiment described above, the functional blocks shown in FIG. 2 show a schematic diagram where structural elements are sorted and shown according to main processing contents to facilitate understanding of the invention of the present application, and sorting into a greater number of structural elements is also possible depending on the processing contents. Furthermore, sorting may be performed to cause one structural element to perform a greater number of processes.

REFERENCE SIGNS LIST

1 high-speed tensile testing machine (tensile testing machine)
12 load mechanism
14 load cell
2 testing machine main body
21 upper grip
22 lower grip
27 load cell
31 hydraulic cylinder
32 piston rod
33 stroke sensor
34 servo valve
4 control unit
41 main body control device
50 personal computer
42 communication unit
54 feedback control unit
56 filter processing unit 58 detection unit
60 peak calculation unit
62 determination unit
64 spectrum storage unit
B intensity
BA predetermined intensity
F test force (load)
FA specific peak frequency (frequency of natural vibration of tensile testing machine)
FB natural frequency
Fd test force measurement value
FR frequency
NA predetermined multiple
P peak
PX maximum peak
PD test period
SP frequency spectrum
T time
TA specific cycle
TP test piece
x amount of displacement

What is claimed is:

1. A system, comprising:
a tensile testing machine for conducting a tensile test on a test piece by applying a load to the test piece; and
a processor configured to
detect a test period indicating a time from start to end of the tensile test; and
determine validity of a test result of the tensile test, on a basis of the detected test period and at least one of a frequency and a cycle of natural vibration of the tensile testing machine.

2. The system according to claim 1, wherein,
the processor determines the validity of the test result on the basis of the detected test period and the frequency of the tensile testing machine, and
in a case where a frequency spectrum indicating the natural vibration of the tensile testing machine includes a plurality of peaks,
a frequency of a peak, an intensity of which is equal to or greater than a predetermined intensity, among the plurality of peaks is used as the frequency of the natural vibration.

3. The system according to claim 1, wherein,
the processor determines the validity of the test result is determined on the basis of the detected test period and the frequency of the tensile testing machine, and
in a case where the frequency spectrum includes a plurality of peaks, intensities of which are equal to or greater than the predetermined intensity,
a frequency of a peak with a smallest frequency among the plurality of peaks, the intensities of which are equal to or greater than the predetermined intensity, is used as the frequency of the natural vibration.

4. The system according to claim 1, wherein
the processor determines the validity of the test result of the tensile test, on a basis of the detected test period and a specific cycle indicating a cycle corresponding to the frequency of the natural vibration.

5. The system according to claim 1, wherein,
the processor determines the validity of the test result is determined on the basis of the detected test period and the cycle of the tensile testing machine, and
in a case where the detected test period is a predetermined multiple or more of the cycle, the processor determines that the test result of the tensile test is valid.

6. A control method of a tensile testing machine, comprising:
conducting a tensile test on a test piece by applying a load to the test piece;
detecting a test period indicating a time from start to end of the tensile test; and
determining validity of a test result of the tensile test, on a basis of the detected test period and at least one of a frequency and a cycle of natural vibration of the tensile testing machine.

7. The method according to claim 6, wherein,
the determining the validity of the test result is based on the detected test period and the frequency of the tensile testing machine, and
in a case where a frequency spectrum indicating the natural vibration of the tensile testing machine includes a plurality of peaks,
a frequency of a peak, an intensity of which is equal to or greater than a predetermined intensity, among the plurality of peaks is used as the frequency of the natural vibration.

8. The method according to claim 6, wherein,
the determining the validity of the test result is based on the detected test period and the frequency of the tensile testing machine, and
in a case where the frequency spectrum includes a plurality of peaks, intensities of which are equal to or greater than the predetermined intensity,
a frequency of a peak with a smallest frequency among the plurality of peaks, the intensities of which are equal to or greater than the predetermined intensity, is used as the frequency of the natural vibration.

9. The method according to claim 6, wherein
the validity of the test result of the tensile test is determined on the basis of the test period and a specific cycle indicating a cycle corresponding to the frequency of the natural vibration.

10. The method according to claim 6, wherein,
the validity of the test result is determined on the basis of the detected test period and the cycle of the tensile testing machine, and
the test result of the tensile test is determined to be valid in a case where the test period is a predetermined multiple or more of the specific cycle.

* * * * *